United States Patent [19]
Mills

[11] 3,882,001
[45] May 6, 1975

[54] METHOD FOR ELECTROCHEMICALLY FORMING FLUOROCARBON COMPOUNDS

[75] Inventor: King L. Mills, Bartlesville, Okla.

[73] Assignee: Phillips Petroleum Company, Bartlesville, Okla.

[22] Filed: Nov. 30, 1973

[21] Appl. No.: 420,529

[52] U.S. Cl. .............................................. 204/59
[51] Int. Cl. ............................................. B01k 3/04
[58] Field of Search ........................... 204/277–278, 204/59 R, 59 F, 81, 79–80

[56] References Cited
UNITED STATES PATENTS
3,558,450 1/1971 Ashe, Jr. et al. ................. 204/277
3,660,255 5/1972 Fox et al. ......................... 204/277

Primary Examiner—R. L. Andrews

[57] ABSTRACT

A method and apparatus for forming fluorocarbon compounds in an electrochemical cell while protecting the anode of said cell.

7 Claims, 3 Drawing Figures

METHOD FOR ELECTROCHEMICALLY FORMING FLUOROCARBON COMPOUNDS

It is desirable to provide method and apparatus for electrochemically forming fluorocarbon compounds while protecting the anode from damage caused by contact with excessive amounts of hydrogen fluoride.

This invention, therefore, resides in a method and an apparatus for forming fluorinated carbon compounds in an electrochemical cell by injecting a feed of vaporized or vaporizable fluorinatable carbon compounds into the electrolyte of an electrochemical fluorination cell at a location within said electrolyte, passing all of said stream of fluorinatable carbon compounds through the electrolyte and while in a vapor phase into contact with an anode of said cell; fluorinating at least a portion of the fluorinatable carbon compounds in the feed stream, recovering the vaporous effluent from the cell and separating fluorinated product from said effluent.

The fluorinatable feed may be selected from any organic compound stable and vaporizable at the operating temperature of the cell which contains carbon-hydrogen bonds in which the hydrogen may be replaced by a fluorine atom. This feed may be a pure compound or a mixture of such fluorinatable compounds. Examples of such fluorinatable compounds are hydrocarbons containing 1-8 carbon atoms, such as methane, ethane, ethylene, propylene, butane, butene, cyclohexane, octane, methyl heptanes, or mixtures of these; alcohols having 1-3 carbon atoms such as methanol, ethanol, propanol and i-propanol; ethers having 2-6 carbon atoms such as methyl ether, ethyl ether, methyl-propyl ether, diisopropyl ether and the like; ketones such as acetone and methyl-ethyl ketone; carboxylic acids such as acetic and propionic acids.

Other aspects, objects, and advantages of the present invention will become apparent from a study of the disclosure, the appended claims, and the drawings.

The drawings are diagrammatic views of the apparatus of this invention.

Figure 1:
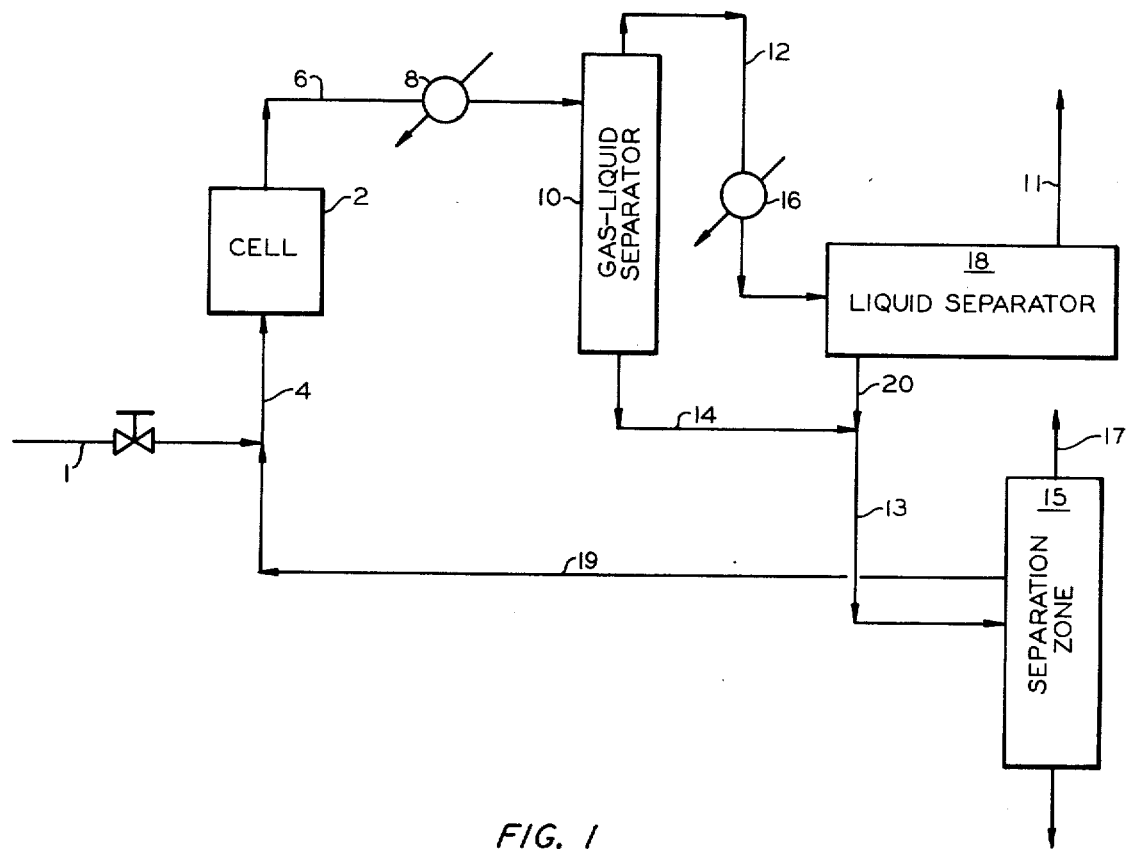
FIG. 1 shows an electrochemical cell and separation equipment.

Referring to FIG. 1, and electrochemical fluorination cell 2 has a gaseous or vaporized feed stream 4 entering a lower portion of the cell and a resultant gas stream 6 discharging from an upper portion of the cell 2. The resultant gas stream 6 passes from the cell to separation equipment where various components are separated from said resultant gases 6.

In an example separation of the resultant gas stream 6, said stream 6 is passed through a chiller 8 for lowering the temperature of the gas 6 and condensing at least a portion of the gas. The resultant material passes from the chiller 8 into a gas liquid separator 10 for separation therein into a gas stream 12 and a liquid product stream 14.

The gas stream 12 from separator 10 is further cooled to liquid nitrogen temperature in chiller 16, passed into a gas-liquid separator 18 and a liquid phase which contains more product and recycle material is recovered in line 20. The overhead residual gas phase 11 from separator 18 contains hydrogen, some hydrogen fluoride, and small amounts of methane and cracked products of the feedstock not condensed by the liquid nitrogen chiller 16. Liquid streams 14 and 20 are combined in line 13 and introduced into fractionator 15 from which a fluorocarbon product stream 17 is recovered and a side draw stream of liquid recycle material 19 is taken which contains unreacted feed, partially fluorinated feed and hydrogen fluoride. The bottoms from separator 15 comprise heavier and polymeric materials which are discarded as a waste stream. The liquid recycle stream 19 comprises 5 to 50 weight percent, generally 10–25 weight percent hydrogen fluoride, and is recycled back into cell 2 via line 4. Fresh feed and/or additional feed hydrogen fluoride is added via line 1.

The fluorinated compounds recovered from the separation zone 15 and/or gas-liquid separator 11 can thereafter be used, as is known in the art, for example, for refrigerants, aerosol propellants and dielectric gases.

Figure 3:
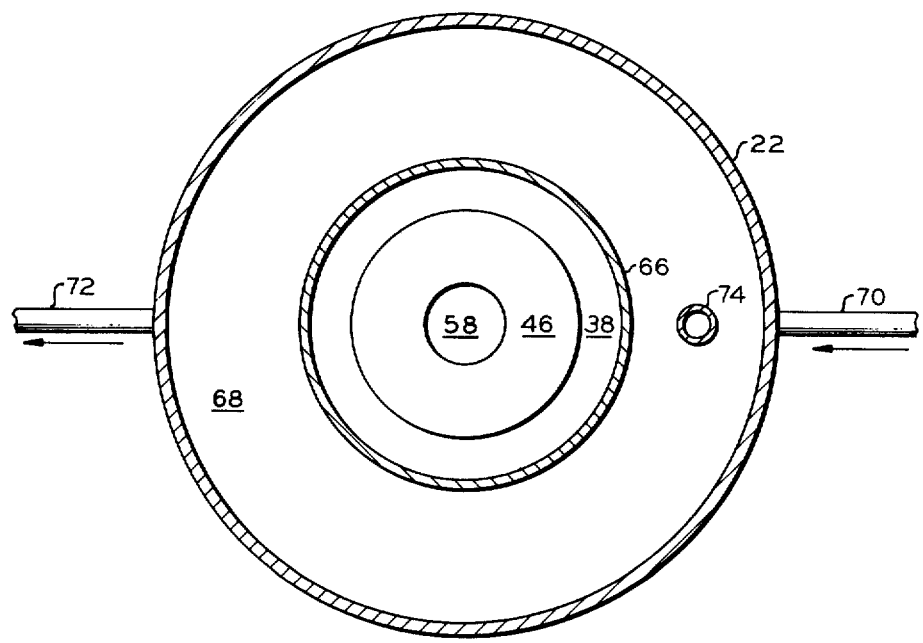
FIG. 3 is a sectional view taken along line 3—3 of the cell.
Figure 2:
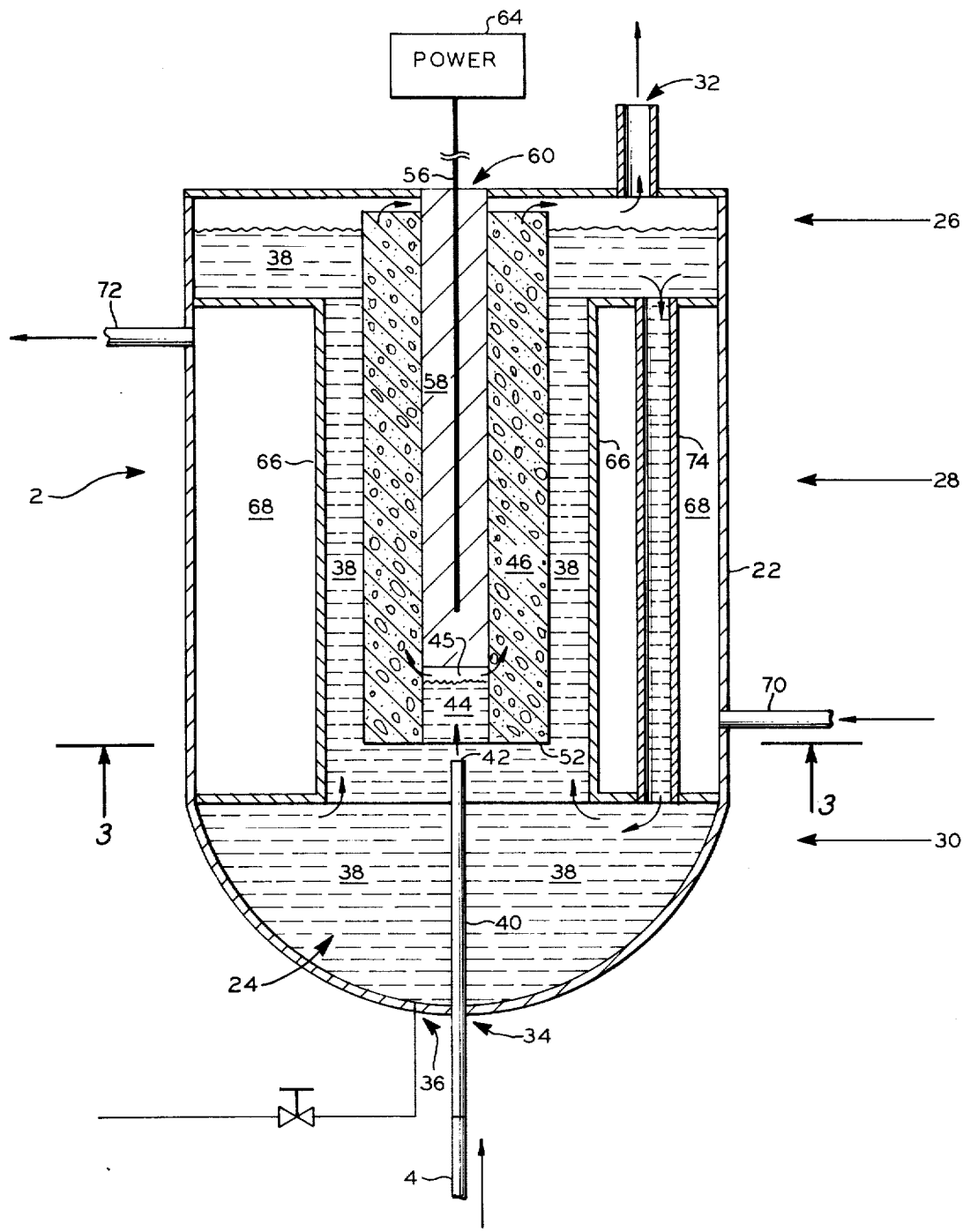
FIG. 2 shows the cell of this invention.

Referring to FIGS. 2 and 3, the electrochemical cell 2 has a shell 22 having a chamber 24 and upper, middle, and lower portions 26, 28 and 30. An opening 32 is formed through the upper portion 26 of the shell 22 for passing the resultant gas stream 6 from the cell 2 into the separation equipment. An opening 34 is formed through the lower portion 30 of the shell 22 for passing the feed stream through the interior of cell 2. An opening 36 is preferably formed through the lower portion 30 of the shell 20 for adding makeup hydrogen fluoride into the cell 22. Fresh feed can be added via line 4 as needed.

A feed conduit 40 extends through the opening 34 in sealing engagement with the shell 22. The feed conduit 40 is connected at one end to line 4 and the discharge end 42 is positioned within the middle portion 28 of the chamber 24 and directed toward a hereafter more fully described plenum chamber 44. The upper discharge opening of conduit 40 is at least 0.5 to 4, preferably 1 to 3 inches below the lowermost extension of anode 46.

An anode 60 comprises a dense nonporous, amorphous carbon center 58 into which is fitted a copper conductor 56 which is connected to an external direct current power source 64 and an outer shell 46 of a porous, conductive carbon. The outer shell 22 of the cell is grounded to complete the circuit. Porous carbons having a permeability of from 0.5 to 7.5 darcys and average pore diameters within the range of 1–150 microns can be employed for the outer shell 46. Generally, carbons having a permeability from about 2 to about 30 darcys and an average pore diameter within the range of from about 20 to about 75 microns are preferred.

As shown in FIG. 2, the outer shell 46 of the anode 60 extends beyond the carbon center 58 forming a small plenum chamber 44 having a vapor space 45 above the electrolyte level. Line 40 terminates directly below said chamber 44 at a point below the lower end 52 of the porous outer shell 46 of the anode 60 so that the feed stream from 40 is discharged into the electrolyte layer just below chamber 44 and into the vapor space 45 from which the feed enters the porous outer shell 46 of the anode.

It is generally preferred in commercial operations that the porous outer shell 46 of the anode extend at least one-eighth inch but not more than 1½ inches below the dense carbon center 58 of the anode 60 to form the plenum chamber 44.

A secondary shell 66 is preferably annularly formed about and spaced from the anode 60 at the middle portion 28 for forming a cooling chamber 68. First and second conduits 70, 72 are in fluid communication with the cooling chamber 68 and fluid process means (not shown) for cooling and circulating coolant through the cooling chamber 68. Where said cooling chamber 68 is utilized, at least one conduit 74 or other downcoming means is positioned through the cooling chamber 68 for circulating electrolyte from above the cooling chamber 68 to a location below the cooling chamber 68 in the lower portion of the cell 2. Circulation of the electrolyte in the cell is accomplished by gas lift provided by the hydrogen generated during the electrolysis.

The electrolyte 38 in the cell 2 comprises a mixture of potassium fluoride and hydrogen fluoride containing from 38 to about 46 weight percent, preferably in the range of about 39 to about 43 weight percent hydrogen fluoride (HF).

In the operation of the cell, vaporized fluorinatable feedstock is introduced through line 40, passing through a layer of electrolyte 38 into plenum chamber 44 and into the pores of the anode 60. The feed rate will vary with the dimensions of the cell and nature of the feed but may be expressed in terms of anode cross-sectional area (taken perpendicular to the direction of flow). For illustrative purposes, the range is preferably about 0.025–0.5 N liters (vapor)* per minute per square centimeter of cross-sectional area. As the feed passes through the porous anode it is fluorinated within the pores of the anode or at the surface of the anode which is in contact with the electrolyte where the electrolysis takes place which provides the fluorinating species. Since fluorination is a stepwise process, the effluent removed from the top of the porous anode section through opening 32 contains unreacted feed, partially fluorinated feed and completely fluorinated feed as well as gaseous hydrogen fluoride and by-product hydrogen.

*N liters = liters of gas measured at standard conditions, i.e., 760 mm Hg and 0°C.

It is desirable in commercial operation to recycle separated unreacted feed and partially fluorinated material from the process. However, this recycle material has as great as 5–50 weight percent hydrogen fluoride contained therein. Recycle of the recovered unconverted and partially fluorinated feed is desirable because in only a single pass through the cell only about 20–40 percent of the available hydrogen in the organic compounds is replaced with fluorine atoms.

Heretofore utilized methods recycle the unconverted and partially converted feed containing the high concentrations of hydrogen fluoride to remove at least a portion of the hydrogen fluoride before recycling said material to the cell.

By the method of this invention wherein the recycle feed stream 19 is first bubbled through the electrolyte and then into contact with the anode, large amounts of the entrained hydrogen fluoride of the recycle feed stream 19 are absorbed by the electrolyte thereby reducing the hydrogen fluoride concentration of the feed stream in contact with the anode to levels below the concentration at which the anode is detrimentally affected. Preferably the hydrogen fluoride concentration in the feed is reduced by at least 50, preferably at least 80 percent by virtue of the feed traveling a distance of at least 0.5 to 4 preferably 1 to 3 inches after discharge into the electrolyte and before initial contact with the porous anode. The hydrogen fluoride concentration in the electrolyte is simultaneously maintained at a value wherein the partial pressure of the electrolyte is less than about 50 mm Hg at the operating temperature and conditions of the cell so as to insure that the electrolyte is maintained in the liquid state. These partial pressures of HF have been determined for various temperatures and are available in publications such as A. J. Rudge "The Manufacture and Use of Fluorine and Its Compounds", Oxford University Press, London, N.Y., Ontario 1962, page 31. My invention thus makes it unnecessary to remove HF from the recycle stream before recycling said stream to the cell.

If the hydrogen fluoride concentration or partial pressure in the electrolyte is too low, about 38 weight percent hydrogen fluoride, the electrolyte freezes and at greater than about 47 weight percent hydrogen fluoride the anode 60 is detrimentally affected by the environment during the operation of the cell.

CALCULATED ILLUSTRATIVE EMBODIMENT

This is an example calculated on the basis of experience with fluorination cells having a similar structure but not embodying the recycle features and feed line modification of this disclosure.

A cell, as shown in FIG. 2, is constructed having the following dimensions: Outside diameter 12 inches; length, overall, 30 inches; cooling jacket 2 inches times 20 inches high; the 24-inch long anode has a 5-inch diameter core of impermeable, dense porosity and is fitted with a 1-inch diameter copper metal conductor connected to a power source; the outer core of the anode, consisting of amorphous carbon with a porpsity of 20 darcys and average pore diameter of 35 microns is 1 inch thick, 21 inches long and has 3.2 sq. ft. surface. The porous section of the anode extends 1 inch below the dense core of the anode forming a skirt defining an annular space 44. The feed line 4 terminates 3 inches below the terminal section of the dense section of the anode.

The gaseous feed passes through the electrolyte into the annular space forming the small gas chamber 45 from which the feed passes into the porous anode portion, rising upward therein and during this passage reacts with the fluorinating species produced by the electrolysis.

Sixty-two and one half pounds of electrolyte having the approximate formula KF.2HF, melting point 80°C, is added to the cell. The cell is operated at 600 amp. hours, at 93°C (220°F). The fluorinatable feed is propane ($C_3H_8$) and the desired product perfluoropropane ($C_3F_8$). After 43 hours, the run is terminated.

During this time a total of 8.70 lbs. propane and 24.0 lbs. anhydrous hydrogen fluoride (HF) is supplied as feed. A total of 20.7 lbs. of $C_3F_8$ is produced together with 2.12 pounds hydrogen and 1.86 pounds of light by-products; additional unconverted and partially converted feedstock accumulated in the system. The recycle stream, consisting of partially fluorinated propane, a little propane and HF is operated at the rate of 3.35 lbs./hr. so that a total of 144.4 pounds of recycle stream is passed through the cell. The recycle stream contains from 5–50 percent by weight of HF fluctuating during the process. Upon examination, the anode shows no sign of deterioration.

The following are operating ranges of the process:

| Location | Range | Preferred |
|---|---|---|
| Cell (2) | | |
| Temperature | Freezing point of electrolyte to decomposition temperature of a mixed stream (4) | 70°C.–125°C. Most preferred: 80–110°C |
| Pressure | 5–50 psia | Ambient pressure on system |
| Residence Time | 0.01–2 minutes | 0.2–2 minutes |
| Feed Rate and Discharge Rate | 0.025–0.5 N liters per min. per sq. cm. of anode area | 0.05–0.4 Nl/min/-sq. cm. anode area |
| Gas-Liquid Separator (10) | | |
| Temperature | −60 to −100°F | −80 to −90°F |
| Pressure | 5–50 psia | Atomspheric |

The apparatus and method of this invention provide a unique system for utilizing a fluorinatable feedstock containing a higher concentration of hydrogen fluoride than that which normally would cause damage to the anode due to higher fluorine production within the confines of the porous section of the anode.

Other modifications and alterations of this invention will become apparent to those skilled in the art from the foregoing discussion and accompanying drawings, and it should be understood that this invention is not to be unduly limited thereto.

What is claimed is:

1. A method for forming a fluorocarbon compound, comprising:

injecting a vaporized recycle feed stream comprising a mixture of a fluorinatable organic compound and a partially unreacted fluorinated compound, said recycle feed stream containing 5–50 weight percent hydrogen fluoride, into an electrolyte of an electrochemical fluorination cell at a location within said electrolyte and adjacent a plenum chamber within an anode;

passing all of said hydrogen fluoride-containing recycle feed through the electrolyte and into contact with said anode of the cell for fluorinating at least a portion of the fluorinatable organic compound and the partially unreacted fluorinated compound of said mixture;

recovering resultant gases from the cell;

separating said fluorinatable organic compound and said partially unreacted fluorinated compound from said resultant gases for said recycle; and separating and recovering said fluorocarbon compound from said resultant gases.

2. A method, as set forth in claim 1, wherein the fluorinatable compound is one of hydrocarbons having 1–6 carbon atoms per molecule, alcohols having 1–3 carbon atoms, ethers having 2–6 carbon atoms, ketones having 2–6 carbon atoms, or carboxylic acids having 1–3 carbon atoms.

3. A method, as set forth in claim 1, wherein said feed contains in addition makeup hydrocarbons.

4. A method, as set forth in claim 1, wherein the partially fluorinated compound stream passed into the cell is in the liquid phase and is vaporized prior to contact with said anode.

5. A method, as set forth in claim 1, wherein the fluorinatable organic compound is separated from the resultant gases by cooling said resultant gases and thereafter passing the cooled resultant gases through a separator.

6. A method, as set forth in claim 1, wherein the electrolyte is a mixture comprising potassium fluoride and hydrogen fluoride and wherein said hydrogen fluoride is said partially fluorided compound feed stream is reduced by at least 50 percent.

7. A method according to claim 1 wherein said recycle feed stream is introduced into said electrolyte at a point 0.5 to 4 inches below a lowermost extension of said anode.

* * * * *